United States Patent
Stathakis et al.

(10) Patent No.: US 11,297,627 B2
(45) Date of Patent: Apr. 5, 2022

(54) METHOD AND APPARATUS FOR LOW-LATENCY TRANSMISSION USING SHARED SR-LESS RESOURCES

(71) Applicant: Telefonaktiebolaget LM Ericsson (publ), Stockholm (SE)

(72) Inventors: Efthymios Stathakis, Stockholm (SE); Håkan Björkegren, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 16/766,971

(22) PCT Filed: Dec. 20, 2017

(86) PCT No.: PCT/SE2017/051312
§ 371 (c)(1),
(2) Date: May 26, 2020

(87) PCT Pub. No.: WO2019/125244
PCT Pub. Date: Jun. 27, 2019

(65) Prior Publication Data
US 2021/0037537 A1 Feb. 4, 2021

(51) Int. Cl.
*H04W 4/00* (2018.01)
*H04W 72/08* (2009.01)
(Continued)

(52) U.S. Cl.
CPC ......... *H04W 72/082* (2013.01); *H04L 5/0055* (2013.01); *H04L 5/0082* (2013.01); *H04W 72/0446* (2013.01); *H04W 72/0453* (2013.01)

(58) Field of Classification Search
CPC .......... H04W 72/082; H04W 72/0446; H04W 72/0453; H04W 72/044; H04W 74/08;
(Continued)

(56) References Cited

U.S. PATENT DOCUMENTS

2017/0288817 A1* 10/2017 Cao .................. H04L 1/1819
2018/0035470 A1* 2/2018 Chen ................. H04W 48/16
(Continued)

FOREIGN PATENT DOCUMENTS

WO 2018144433 A1 8/2018

OTHER PUBLICATIONS

MediaTek Inc., "Grant-free Scheduling and retransmission schemes for UL URLLC Document for: Discussion and Decision", R1-1710835, Jun. 27-30, 2017. (From Applicant's IDS) (Year: 2017).*
(Continued)

*Primary Examiner* — Mang Hang Yeung
(74) *Attorney, Agent, or Firm* — Sage Patent Group

(57) ABSTRACT

A method of operating a network node in a Radio Access Network includes configuring a first User Equipment with a first transmission pattern indicating time-frequency resources and configuring a second UE with a second transmission pattern indicating time-frequency resources. The method further includes receiving a first signal comprising a first message from the first UE, using a first time-frequency resource indicated by the first transmission pattern and receiving a second signal comprising a second message from the second UE, using a second time-frequency resource indicated by the second transmission pattern. The first and second time-frequency resources, at least partly, overlap. Further, the method includes decoding the first or the second message, based on a received third signal comprising the first message from the first UE, wherein the third signal is received using a third time-frequency resource indicated by the first transmission pattern.

20 Claims, 7 Drawing Sheets

(51) Int. Cl.
*H04L 5/00* (2006.01)
*H04W 72/04* (2009.01)

(58) Field of Classification Search
CPC ............ H04W 52/0238; H04L 5/0055; H04L 5/0082; H04L 5/003; H04L 5/0005; H04L 5/0092; Y02D 30/70
USPC ........................................................ 370/329
See application file for complete search history.

(56) References Cited

U.S. PATENT DOCUMENTS

| | | | |
|---|---|---|---|
| 2018/0070335 A1* | 3/2018 | Amuru | H04L 5/0091 |
| 2018/0167182 A1* | 6/2018 | Cao | H04L 5/0007 |
| 2018/0324830 A1* | 11/2018 | Islam | H04W 72/1236 |
| 2019/0075581 A1* | 3/2019 | Salem | H04W 74/006 |

OTHER PUBLICATIONS

InterDigital Communications, "Scheduling and Support for service multiplexing", R1-1610090, Oct. 10-14, 2016 (From Applicant's IDS). (Year: 2016).*

PCT International Search Report and Written Opinion, dated Oct. 25, 2018, for International Application PCT/SE2017/051312, 12 pages.
Huawei, HiSilicon, 3GPP TSG RAN WG1 Meeting #86bis, R1-1608861, "Resource Allocation and Management for Grant-Free UL", Lisbon, Portugal, Oct. 10-14, 2016, 5 pages.
ZTE, 3GPP TSG RAN WG1 Meeting #86bis, R1-1608959, "Fast Scheduling and Transmission for NR", Lisbon Portugal, Oct. 10-14, 2016, 7 pages.
ZTE, 3GPP TSG RAN WG1 Meeting #86, R1-167089, "Discusssion on NR Operation in Unlicensed Spectrum", Göteborg, Sweden, Aug. 22-26, 2016, 7 pages.
Sony, 3GPP TSG RAN WG1 #87, R1-1611549, "Discussion on NR Uplink Interleave-Domain NOMA", Reno, USA, Nov. 14-18, 2016, 3 pages.
Extended European Search Report for European Patent Application No. 17935314.9 dated Jun. 7, 2021, 10 pages.
Mediatek Inc., 3GPP TSG RAN WG1 NR Ad-Hoc#2, R1-1710835, "Grant-Free Scheduling and Retransmission Schemes for UL URLLC", Qingdao, P.R. China, Jun. 27-30, 2017, XP051300039, 7 pages.
Interdigital Communications, 3GPP TSG-RAN WG1 Meeting #86bis, R1-1610090, "Scheduling and Support for Service Multiplexing", Lisbon, Portugal, Oct. 10-14, 2016, XP051159901, 6 pages.

* cited by examiner

METHOD AND APPARATUS FOR LOW-LATENCY TRANSMISSION USING SHARED SR-LESS RESOURCES

CROSS-REFERENCE TO RELATED APPLICATIONS

This application is a 35 U.S.C. § 371 national stage application for International Application No. PCT/SE2017/051312, entitled "METHOD AND APPARATUS FOR LOW-LATENCY TRANSMISSION USING SHARED SR-LESS RESOURCES", filed on Dec. 20, 2017, the disclosures and contents of which are hereby incorporated by reference in their entireties.

TECHNICAL FIELD

This disclosure pertains to wireless communication technology, in particular in the context of 5G telecommunication, e.g. New Radio (NR) or LTE Evolution.

BACKGROUND

Currently, 3GPP is developing the radio network for fifth generation of radio access technology, often called as NR, in parallel with the radio network for fourth generation of radio access technology commonly referred to as LTE. One of the use-cases that has been identified as central in New Radio (NR) and LTE is that of ultra-reliable low latency communications (uRLLC). In this use-case, packet and/or message transmission may be subject to very stringent demands on latency and reliability which may require from the system to achieve a block-error-rate of $10^{-5}$ within a few milliseconds. Communications, with such performance targets, may arise in a number of situations:

An example are control components in manufacturing facilities, e.g., robot arms that are placing components on an assembly line. These components will have to interact wirelessly and send control signals very quickly and with high reliability, when certain events take place. For instance, when a number of robot arms in the assembly line start to malfunction and the whole process has to be to be halted for maintenance, it is important that the components are able to send a halt signal as soon as possible. In this particular case, communication consists of small messages and/or data packets representing a message, which are generated on demand. A message may comprise data packets.

Another example are conventional monitoring systems, e.g., a set of surveillance cameras and activity detection sensors for tracing possible trespassing activity within a designated area. In this scenario, if the system detects the presence of unscheduled or unexpected activity within the area of interest, then many alarms will be triggered at approximately the same time and different types of data, e.g., position, time, actions required etc., will have to be communicated. The UEs that are remotely located, and not wired to a central node, will have to transmit such information wirelessly and simultaneously.

In these two examples, transmission is sporadic and aperiodic since, in both cases, we expect these events to rarely take place. However, when a triggering event occurs, then a certain (and potentially large) number of UEs will need to obtain scheduled time/frequency resources in order to send their data. Depending on the type of application, this number can vary from a few to tens of UEs.

In legacy LTE systems, a scheduling request (SR) takes place when a packet and/or message arrives in the buffer. To obtain a transmission grant, corresponding to a sent SR, there is a need to carry out a number of signaling steps, which precede the actual data transmission; this entails certain communication overhead. In particular, the UE has to go through a handshake process with the network (e.g. a gNB and/or eNB) in order to get reserved resources and thereafter establish a connection for data transmission. This handshake may consist of the exchange of several messages, between the UE and a network node (e.g. gNB or eNB), that will contribute to the overall end-to-end latency and thus increase latency for delay sensitive use-cases, such as for the scenarios described above.

SUMMARY

It is an object of this disclosure to provide approaches allowing spectral efficient and low latency transmission of data in the context of uRLLC use cases where the transmission and/or reception of data is using SR-less or grant-free resources.

The approaches described herein are particularly useful in the context of NR Radio Access Technology/Networks (NR RAT/RAN). Thus, a network node may be a base station and in particular e.g. a gNB or eNB in some cases.

Accordingly, there is disclosed a method of operating a network node in a Radio Access Network. The method comprises configuring a first User Equipment with a first transmission pattern indicating time-frequency resources and configuring a second UE with a second transmission pattern indicating time-frequency resources. A transmission pattern indicating time-frequency resources may e.g. indicate a sequence of time-frequency resources to be used by a UE for transmission of a signal comprising a message. The time-frequency resources may be SR-less resources or grant-free resources, which are free to use for transmission without requesting access from the network. The method further comprises receiving a first signal comprising a first message from the first UE, using a first time-frequency resource indicated by the first transmission pattern and receiving a second signal comprising a second message from the second UE, using a second time-frequency resource indicated by the second transmission pattern. The first- and second time-frequency resources, at least partly, overlap. The first- and the second time-frequency resource are considered to overlap if the first- and the second signals are received using common time-frequency resources. Further, the method comprises decoding the first- or the second message, based on a received third signal comprising the first message from the first UE, wherein the third signal is received using a third time-frequency resource indicated by the first transmission pattern. The third signal may have been received prior to receiving the first- and second signals and a representation of the received third signal may have been buffered and/or stored in a buffer, in the network node. Additionally and/or optionally a representation of the combined first- and second signals are buffered and/or stored in a buffer prior to receiving the third signal.

Also, there is disclosed a network node for a Radio Access Network. The network node is adapted for adapted for configuring a first User Equipment, UEs, with a first transmission pattern indicating time-frequency resources and configuring a second UE with a second transmission pattern indicating time-frequency resources. A transmission pattern indicating time-frequency resources may e.g. indicate a sequence of time-frequency resources to be used by a UE for transmission of a signal comprising message. The time-frequency resources may be SR-less resources or grant-free resources, which are free to use for transmission without requesting access from the network. The network node is further adapted for receiving a first signal comprising a first message from the first UE, using a first time-frequency resource indicated by the first transmission pattern and receiving a second signal comprising a second message from the second UE, using a second time-frequency resource indicated by the second transmission pattern, wherein the first- and second time-frequency resources, at least partly, overlap. The first- and the second time-frequency resource are considered to overlap if the first- and the second signals are received using common time-frequency resources. The network node is further adapted for decoding the second message, based on a received third signal comprising the first message from the first UE, wherein the third signal is received using a third time-frequency resource indicated by the first transmission pattern. The third signal may have been received prior to receiving the first- and second signals and a representation of the received third signal may have been buffered and/or stored in a buffer, in the network node. Additionally and/or optionally a representation of the combined first- and second signals are buffered and/or stored in a buffer prior to receiving the third signal. The network node may comprise, and/or be adapted for utilising, processing circuitry and/or radio circuitry, in particular a transmitter and/or receiver, for transmitting and/or signaling. Alternatively, or additionally, the network node may comprise a corresponding transmitting- and/or receiving module.

A transmission pattern indicating time-frequency resources may e.g. indicate a sequence of time-frequency resources to be used by a UE for transmission of a signal comprising message or used by a network node for reception of a signal comprising message. A time-frequency resource may comprise a time duration (e.g. a transmission time interval, a slot, a mini-slot, a sub-frame or a radio-frame) and an associated frequency resource (e.g. one or more subcarriers). The transmission pattern may e.g. indicate transmission opportunities and corresponding frequency resources, such as subcarriers. The transmission opportunities may be indicated by certain numbers representing a numbers within a cyclic numbering scheme within a transmission timing structure. The number of transmission opportunities within a cyclic numbering scheme may be less than a threshold L, where L is an integer number representing a maximum number of repetitions and/or transmissions. The frequency resources may be indicated as one or more subcarriers.

Configuring a UE with a transmission pattern indicating time-frequency resources may comprise transmitting a signal comprising a transmission pattern indicating time-frequency resources, to the UE. Additionally and/or optionally it may also comprise scheduling the UE with time-frequency resources, in particular SR-less resources, according to the transmission pattern.

An SR-less resource herein, may pertain to a time-frequency resource, in particular to a frequency resource, that may be repeated in time. An SR-less resource may be used by a UE to transmit signals and/or by a network node to receive signals. The repetition of an SR-less resource may be achieved by a network node configuring a UE with a transmission pattern indicating repetitive resources in the time-frequency domain. The configuring a UE with a transmission pattern may comprise scheduling the UE with semi-persistent resources to be used for transmitting a signal comprising a message without first requesting a grant from the network.

BRIEF DESCRIPTION OF THE DRAWINGS

The drawings are provided to illustrate concepts and approaches described herein, and are not intended to limit their scope. The drawings comprise.

DETAILED DESCRIPTION

Some of the aspects contemplated herein will now be described more fully with reference to the accompanying drawings. Other aspects, however, are contained within the scope of the subject matter disclosed herein, the disclosed subject matter should not be construed as limited to only the aspect set forth herein; rather, these aspects are provided by way of example to convey the scope of the subject matter to those skilled in the art.

To reduce the latency and address demanding uRLLC use-cases, it has been agreed in 3GPP to include support for grant-free or SR-less (e.g. a UE transmitting on a resource without transmitting a Scheduling Request to the network node) access in the uplink, by e.g. removing SR grant handshake signaling or overhead and directly transmit the data that arrive at the buffer. By obviating a SR grant step, signaling overhead can be reduced to:

achieve lower latency; and
improve reliability by exploiting the gained time to add redundancy.

Moreover, it has been proposed, in 3GPP, to include solutions that may allow for multiple consecutive transmissions and/or repetitions of an initial transmission including a possibility for frequency hopping by the UE when transmitting a signal using SR-less resources. Multiple consecutive transmissions and/or repetitions may be allowed for a maximum number of transmissions or until an ACK of a transmitted message is received [1]. Multiple transmissions may allow for a receiver to accumulate energy, which will improve the chances of a successful decoding and/or reception of the message. A message may comprise one or more data packets.

However, to achieve low latency, a network node (e.g. a gNB or an eNB) must frequently release resources for wireless terminals (e.g. UEs) supporting uRLLC use cases. Such resources can be for instance Semi-Persistent Scheduled, SPS, resources where a network node configures a wireless terminal by e.g.:

a) RRC- or higher-layer signaling meaning that there is no L1 activation in the DCI. In this manner a terminal or UE can use the configured resources whenever a packet and/or message arrives; or
b) L1-activation via DCI, after which a terminal or UE may transmit using the SPS resources [2].

Figure 2:
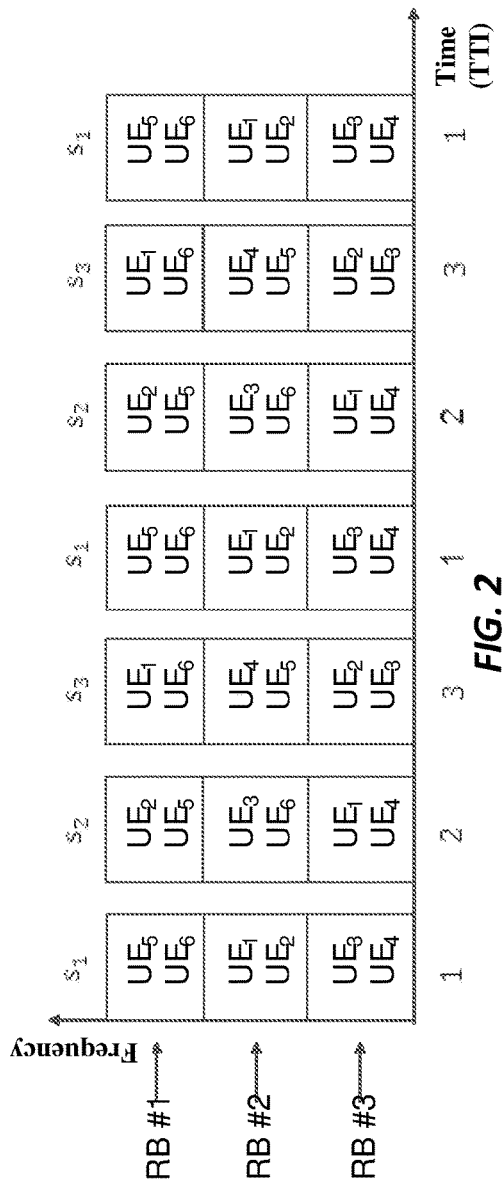
FIG. 2 illustrating an example of a UE to resource allocation obtained by a network node configuring several UEs with a transmission pattern.

These grants-free or SR-less resources may be made available on a regular basis, with a mapping that may be implicitly or explicitly known for the terminals supporting uRLLC use cases and which resources may be used on demand when a data packet or message arrives at the buffer of the terminals supporting uRLLC use cases. Otherwise the wireless terminal (e.g. a UE) may have to send an access request, which in turn will contribute into the overall latency. Therefore, the grant-free/SR-less resources need to be available in a semi-persistent scheduling (SPS) or RRC-configured fashion. However, when many wireless terminals (e.g. UEs), with sporadic traffic profile, want to access the network then assigning dedicated resources to each of the wireless terminals (e.g. UEs) individually, in a one-to-one fashion, is not a spectrally efficient solution. If a wireless terminal (e.g. a UE) is active only for a small fraction of the time, during which the resource is available, then the utilization level, which is proportional to the wireless terminal's (e.g. a UE) activity level, will be very low. The frequency resources will be underutilized since they will be tied for usage by uRLLC terminals, yet they will remain mostly unused. To improve the utilization by effectively increasing the occupancy of the grant-free- and/or SR-less resources, it is better to allow users to share these resources, e.g. by allocating the same set of grant free and/or SR-less resources to more than one UE. A network node (e.g. a gNB or eNB) can divide the UEs into non-overlapping groups of UEs and each group will be allocated a set of grant-free and/or SR-less resources (e.g. blocks or RBs) to use for transmission. An illustration of this process in given in FIG. 2, where six UEs are partitioned into three separate groups, of two UEs each. When a wireless terminal (e.g. a UE) has a message and/or packet in its buffer, it can transmit it on the next available SR-less time-frequency resource (e.g. RB).

The fact that we have a "many-to-one" UE-to-resource allocation, makes the access contention-based. E.g., if two (or more) UEs, within the same group, send their messages and/or packets simultaneously then collisions will take place and packets and/or messages may get lost. It shall be noted that the gNB/eNB does not know in advance whether only one or all wireless terminals (e.g. UEs) are transmitting using a given resource and/or slot, because:

a) communication is bursty, e.g. a UE is not necessarily transmitting using all the allocated and/or configured resources, in other words a UE is not always active on the resources; and b) multiple UEs may be assigned the same grant-free/SR-less resources. For these reasons, a silent acknowledgement cannot be exploited to indicate a successful transmission but instead it may be explicitly communicated. In the scenarios, under consideration, a UE waiting for a NACK response from the network node, in order to verify a lost packet and/or message, would increase the system latency. If the packet and/or message is lost due to collision between different UEs, then the system reliability will also be compromised.

Figure 7:
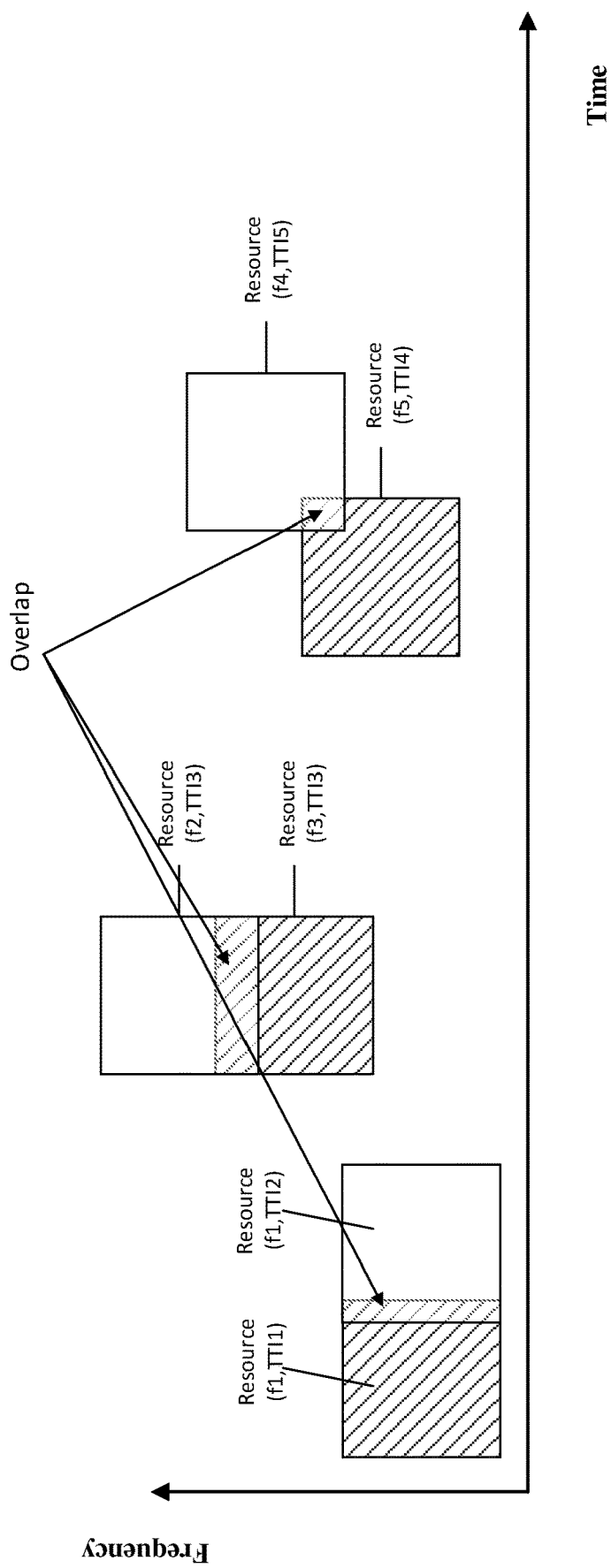
FIG. 7, illustrating examples of overlapping time-frequency resources.

Consequently, a critical issue to handle in shared grant-free- and/or SR-less access, is packet- and/or message-loss due to collision, which may happen when two UEs are using overlapping resources for transmission (examples of overlapping resources are illustrated in FIG. 7). To increase the reliability and alleviate any extra latency due to collisions, it should be possible to allow for a number of L transmissions or repetitions from a UE (e.g. transmissions according to a transmission pattern) where the transmissions are combined at the network node (e.g. gNB or eNB) and certain frequency hopping patterns are used by each wireless terminal (e.g. a UE). In other words, it should be possible to:

a) Allow the UEs to repeat their data transmission continuously, for a certain integer number L times (and/or optionally for a duration of L), until the limit L is reached or an ACK message, indicating successful reception of the message by the network node, is received by the wireless terminal (e.g. a UE).

b) To re-group the UEs during each transmission slot, e.g. at each TTI (or slot), reassign the UEs into new groups such that a UE will use different resources (e.g. different RBs) in order to get frequency diversity that can be exploited during the decoding process.

c) To exploit buffered data for performing interference cancellation (IC) when the buffer contains data from at least two consecutive repetitions/transmissions. This information is not utilized by current systems but this information may be advantageously exploited by e.g. assuming that at times t0 and t0+1 there were collisions among UEs. If some UEs were successfully resolved at time t0+1 then the network node (e.g. gNB or eNB) can subtract their contribution from the signal or signals that are buffered at time t0 and decode the remaining UEs, whose signals are now subject to less interference.

Figure 3:
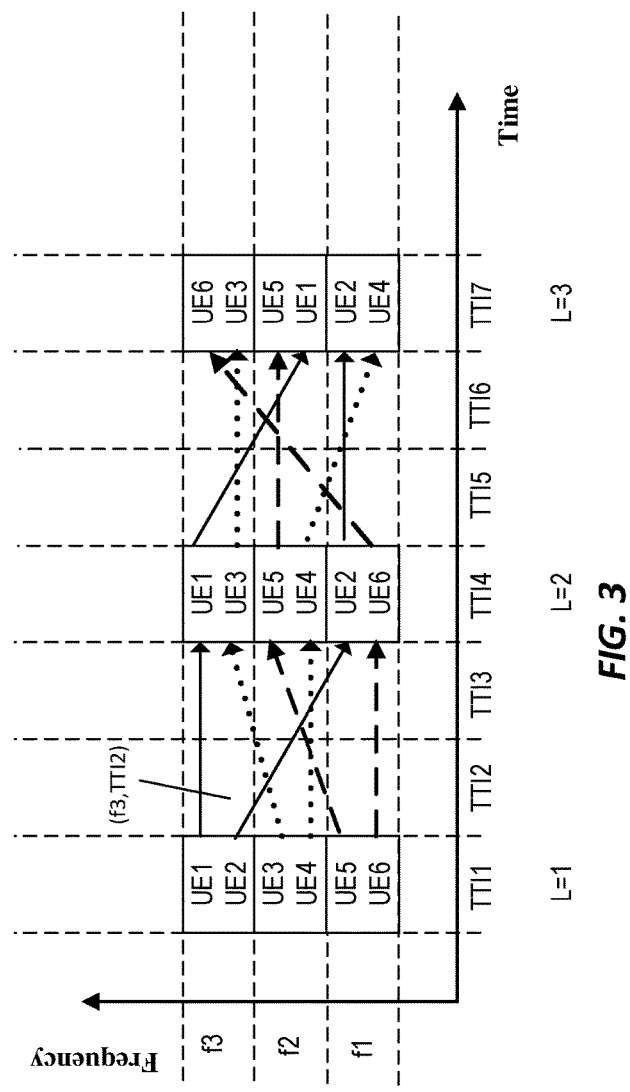
FIGS. 3 to 6, illustrating exemplary scenarios of the solution in this disclosure.

In order to achieve a) and b) above, a network node (e.g. a gNB) may configure a first User Equipment (UE1), UE, with a first transmission pattern (20a) and configure a second UE (UE2) with a second transmission pattern (20b), wherein the transmission pattern may indicate e.g. a sequence of time-frequency resources represented by e.g. a sequence of time-frequency resource pairs. In FIG. 3, there is an illustration of a time-frequency grid with certain time-frequency resource pairs (fn, TTIn), which are used for transmission by different UEs. The time-frequency resource pairs (fn, TTIn) in FIG. 3 illustrates repeated transmissions/receptions using shared grant-free access and/or SR-less access and UEs are configured with transmission patterns. It is illustrated that the UEs may change frequency resources between TTIs or transmission opportunities and it is further illustrated by different line shapes, how the different UEs use different SR-less resources in different transmission opportunities. E.g. solid lines are used for UE1 and UE2, dotted lines for UE3 and UE4 and dashed lines are used for UE5 and UE6. In FIG. 3, a time-frequency resource pair is indicated in the grid of horizontal and vertical dashed lines. The time-frequency resource pairs that are tagged with "UEi"-text are to be understood as time-frequency resource pairs used for transmission by "UEi". These are examples of SPS resources according to UE specific transmission patterns, which the UEs shall use for SR-less access. From FIG. 3 it is understood that each UE (UEi, i=1 . . . 6) may transmit a at TTI1, TTI4 and TTI7 (which are examples of transmission opportunities). It can also be understood that e.g. UE1 may transmit in time-frequency resource pairs (f3, TTI1), (f3, TTI2) and (f2, TTI3) whereas UE2 may transmit using in time-frequency resource pairs (f3, TTI1), (f1, TTI2) and (f1, TT3). These sequences of time-frequency resource pairs is an example of a transmission pattern. Theses sequences may be repeated. The transmission patterns illustrated in FIG. 3 comprise three transmission opportunities, which is one example of a length of a transmission pattern. It shall be noted that the transmission opportunities of a transmission pattern can be repeated according to a cycle as will be further described below. Another example of a length of a transmission pattern could be a time duration. An example of a time duration may e.g. be a multiple integer of a Radio Frame Number (RFN) cycle or a corresponding cycle of 10×1 ms subframes (a subframe cycle). The length of the transmission pattern may e.g. correspond to under a) above. In FIG. 3, each UE is assumed to be configured, by a network node, with a transmission pattern indicating the time-frequency resources to use for L=3 transmissions or transmission opportunities. The transmission pattern may be repeated for further transmissions.

Figure 4:
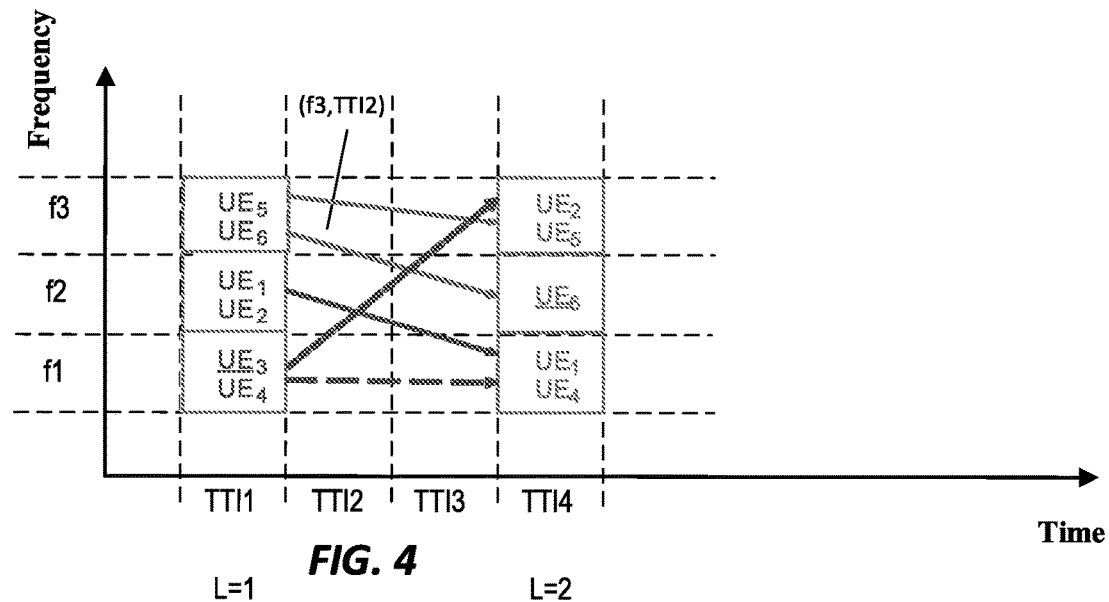

It will now be explained, with reference to FIG. 4, how to exploit buffered data as suggested under c) above. In FIG. 4 it is shown that the network node receives the transmissions from e.g. UE6, (by e.g. receiving a first signal and/or transmission comprising a first message from UE6), which have used f3 and TT1 as the first time-frequency resource indicated by the first transmission pattern as described above. The network node may also receive a second signal and/or transmission, comprising a second message from e.g. UE5, which have used f3 and TTI1 as the second time-frequency resource indicated by the second transmission pattern, wherein the first- and second time-frequency resources, at least partly, overlap. In this case the first- and second time-frequency resources are the same and consequently overlap. The first- and second messages are not decoded properly and therefore a representation of the received first- and second signals are stored in a buffer in the network node. In FIG. 4 it also is shown that at a later time instance, in TTI4, the network node receives a third signal comprising the second message, from UE6. The signal from UE6 is received using a third time-frequency resource, which is only used by UE6 and therefore the first message is likely to be decoded successfully by the network node. At the same time instance (TTI4), the network node receives a signal comprising the first message, from UE5, using the resource pair f3 and TTI4. If decoding of the first message is not successful due to collision with a signal from UE2, the network node may try decode the first message by subtracting a representation of the third signal from the previously stored representation of the first- and second signals. Since the third signal comprises the same modulated bits and/or symbols as the first message, a subtraction of the representation of the third signal, from the representation of the combined first- and second signals, would result in the second signal comprising the second message as if it was transmitted using a non-overlapping and/or interference-free resources. In other words the subtraction would result in the second signal comprising the second message as if it was transmitted with no collision. In other words, a method in the network node may comprise decoding the second message, based on a received third signal comprising the first message from the first UE, where the third signal was received using a third time-frequency resource indicated by the first transmission pattern.

The examples provided in this disclosure takes advantage of the following:
  i. continuous transmission with frequency hopping;
  ii. wireless terminal (e.g. a UE) using different SR-less resources for each transmission opportunity (e.g. a slot or TTI); and
  iii. the possibility to conduct IC of the resolved UEs at the network node (e.g. gNB or eNB).

The combination of these methods can reduce latency for shared grant-free access. It can further expedite the resolution of wireless terminal (e.g. a UE) messages and/or signals and/or transmissions, compared to the baseline case where a UE simply repeats its transmissions of data over the same set of resources, in particular frequency resources. The benefits of the examples provided herein, stem from each of the above components i.-iii, and can be summarized as follows:
  UEs that have not received an ACK, transmit again according to their hopping pattern or transmission pattern. The repeated transmissions will allow a network node such as e.g. a gNB, to gradually accumulate more energy for a UE-specific packet and/or message.

The frequency hopping (e.g. obtained by a transmission pattern) is a source of frequency diversity for the repeated transmissions. Since the channel conditions between a UE and a network node may vary with the frequency used for transmission and/or reception, it is possible to utilize that a transmission/reception using a certain frequency resource may experience sufficiently good channel conditions which can be utilized by the network node (e.g. gNB or eNB) in order to correctly receive a transmission from a UE.

The UE regrouping acts as a form of network coding since the network node (e.g. gNB or eNB) receives different combinations of UEs at each slot. This can be utilized, in combination with interference cancellation in order to decrease the latency by removing the interference of successfully decoded packet and/or messages from past combinations. The UE regrouping may also be obtained by the network node configuring the UEs with a transmission pattern.

It shall be mentioned that the benefit is more pronounced when multiple UEs are simultaneously active over the same set of allocated resources and their packet transmissions are colliding, e.g. when UEs are using overlapping resources for transmission.

In relation to FIG. 3. a general example will now be described. In this example there are M=3 grant-free resources (e.g. RBs) that are repeated in time, e.g. repeated each transmission time interval, TTI (in FIG. 3, the grant-free resources are represented by frequency resources f1, f2 and f3 and M=3). These resources may be assigned with e.g. SPS (semi-persistent scheduling). In this example there are N=6 UEs sharing the M=3 grant-free/SR-less resources. It shall be noted that there are more UEs than SR-less resources. Each UE can repeat its transmission at most L=3 times. Generally, a network node may divide the UEs into M groups, of equal size K=N/M. In FIG. 3. K=6/3=2 UEs per group. In this particular case N is an integer multiple of M. In case this is not the case, a rounding operation may be performed to get a size of a UE group. The indices of the UEs, that are assigned onto each of the 3 grant-free resources, may vary over time due to frequency hopping. An example of how to assign different UEs to different grant-free resources over time is provided below, but in relation to FIG. 3, the UEs may e.g. be indexed by the network node in order to control how to configure a transmission patterns for the UEs served by the network node. In this example a UE is indexed with an "n", e.g. UEk, where n=1, 2, 3, 4, 5, 6. In FIG. 3. the UE with indices for grant-free resource f3 in TTI1 are "1" and "2" (UE1 and UE2) whereas the UE indices for f3 in TTI4 are "1" and "3" (UE1 and UE3). As illustrated in FIG. 3, a network node have configured the following UE indices to the different grant-free resources:
  At TTI1:
    UE1 and UE2 are grouped to use f3;
    UE3 and UE4 are grouped to use f2;
    UE5 and UE6 are grouped to use f1;
  At TTI4:
    UE1 and UE3 are grouped to use f3;
    UE5 and UE4 are grouped to use f2;
    UE2 and UE6 are grouped to use f1;
  At TTI7:
    UE6 and UE3 are grouped to use f3;
    UE5 and UE1 are grouped to use f2;
    UE2 and UE4 are grouped to use f1;

If it is assumed that a signal transmitted by UE1 is not successfully decoded at instant TTI1, due to collision with signal transmitted by UE2 (also using f3 for transmission), and further assuming that all signals transmitted by UE2-UEM are successfully decoded at TTI4, then, the network node (e.g. gNB or eNB) can cancel out their interference by having received and buffered the signals transmitted at TTI1 so that the transmitted signal of UE1 at TTI1 is interference-free. This will significantly increase the probability of successful decoding. The principle of utilizing buffering of received signals from UEs transmitting using grant-free resources, in order to recover messages, can be very powerful. It shall be mentioned that at UEs are generally assigned different SR-less resources between different TTIs or slots. The assignment of resources, should be such that UEs assigned to use the same SR-less resource in one TTI are preferably separated so that at least one UE is assigned to transmit on a different SR-less resource in a consecutive TTI and/or transmission opportunity. Thereby the benefit from multi-user diversity is increased.

If there is collision between signals in the first transmission opportunity and/or TTI and/or slot, some messages comprised in signals transmitted by some UEs may be decoded and some messages may not be decoded. However, it can be assumed that UEs can be correctly identified, via the Demodulation reference signal (DMRS), which is used to retrieve the channel estimates of each transmission by a UE.

In the following there are considered some special scenarios in order to illustrate how the proposed method can be beneficial compared to legacy retransmission. In FIG. 4, a scenario with successful application of interference cancellation (IC) in two slots/TTIs is illustrated. In FIG. 4. UEs that are transmitting messages which are decoded successfully upon reception, without IC, are underlined.

In a scenario, illustrated in FIG. 4, UE3 is successfully decoded in TTI1. Under the assumption that IC is successfully applied on the buffered signals, by the network node (e.g. gNB or eNB), the network node can also act according to the following sequence of events:
1. There will be no or little interference to UE6 in TTI4, and the corresponding transmission by UE6 will be successfully received in the sense that the transmitted data packets and/or messages will be decoded successfully with high probability.
2. Using the correctly decoded data packet and/or message of UE6 from TTI4, the network node can exploit the buffered signals from the previous slot, TTI1, in order to cancel out its contribution from the aggregate received signal in TTI1 on frequency f3. In particular, if IC is successfully applied, the network node, can subtract the contribution from the transmission by UE6 in TTI1, from the buffered signal in TT1, on f3, in order to decode the data packet and/or message received from UE5.
3. If the previous step is successful then the network node can attempt to recover the data packet and/or message transmitted by UE2, from the received signal in TTI4 on f3 by cancelling out the contribution of the signal from UE5. If the also the message from UE2 is successfully decoded, the network node may apply the same principle to successfully decode the message transmitted by UE1 in TTI1 on f2. This way, it is possible to remove the interference from all buffered signals and decode everything in two steps, albeit the fact that the UEs experience multiple collisions.

Figure 5:
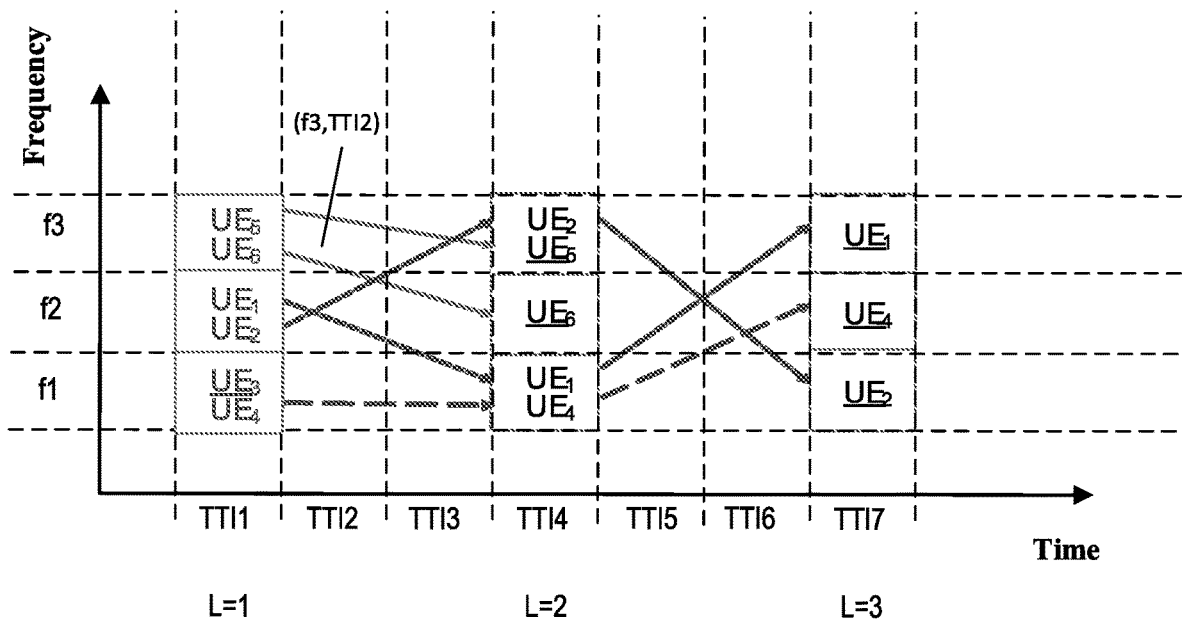

Another scenario is depicted in FIG. 5, which illustrates a scenario with successful reception is three slots (e.g. three repetitions and/or transmissions using the SPS resources according to a transmission pattern). The UEs whose transmitted messages are decoded successfully upon reception (not after IC) are underlined. In this scenario, it is assumed that it is not possible to successfully apply IC to all the buffered received signals during the first two slots (or TTIs or transmission opportunities). Therefore, some UEs will have to transmit a third repetition/transmission in a third slot or TTI. In this case, the following actions may be performed:

E1: UE3 is decoded in TTI1 and UE6 in TTI4, respectively. The network node may apply interference cancellation based on buffered information, representing the received signals from TTI1 and f3 to recover and/or decode the message from UE5. We assume that IC cannot be applied successfully to the remaining signals.

E2: Since the messages from UE3, UE5 and UE6 were decoded successfully, there is no need for these UEs to transmit using a third repetition. Therefore, UE1, UE2 and UE4 may get an opportunity to transmit signals using frequency resources in TTI7, such that no collisions occur and consequently the messages from transmission by these latter UEs are likely successfully decoded by the network node. It shall be noted that depending on which messages are decoded first, the transmission pattern may also cause several UEs to transmit on colliding and/or overlapping resources even in cases where there are more frequency resources than UEs. This is due to the act that the network node configures each UE with a transmission pattern before the UE transmits any signals, consequently the transmission pattern is not aware of the outcome of future decoding of messages transmitted by the UEs.

Figure 6:
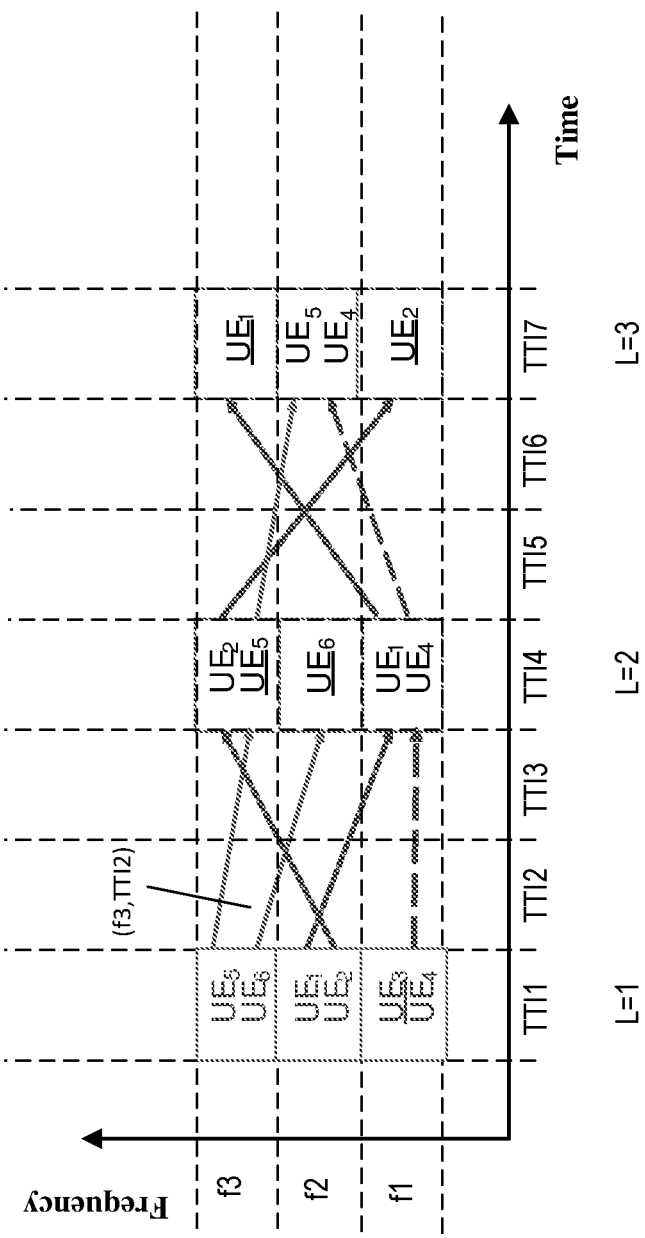

Now turning to FIG. 6, which illustrates a scenario with successful decoding of messages in three slots, in line with the scenario illustrated in FIG. 5. Again, it is assumed that it is not possible to successfully apply IC to all the buffered received signals during the first two slots (or TTIs or transmission opportunities). Therefore, some UEs will have to transmit a third repetition/transmission in a third slot or TTI. In this case, the following actions may be performed:

E11: UE3 is decoded in TTI1 and UE6 in TTI4, respectively. Interference cancellation is not successful at this step for retrieving any other UE.

E12: In TTI7, UE1 and UE2 are interference-free and we assume that their transmitted messages can be decoded with high probability.

E13: A network node may, by using the received signals from UE1 and UE2, for which messages were successfully decoded in TTI4, apply interference cancellation on the buffered signals representing transmissions in TTI4 on f3 and f1 respectively, to decode the messages transmitted by UE4, using f1 in TTI4, and UE5, using f3 in TTI4.

E14: By applying IC, the network node obtains interference-free versions of signals received in TTI1 and TTI4. Thereby, the network node may successfully decode messages in TTI1 and TTI4. However, not all interference-free transmissions are successful, but since the signals have been received on different frequencies, the network node may combine the interference-free versions of signals, comprising the same message, and therefore benefit from frequency diversity, which will improve the decoding of messages.

E15: If at least one message transmitted by UE4 or UE5 is successfully decoded, then the network node may remove its contribution, by applying IC, from the buffer representing the received signal using f2 in TTI7 and obtain an interference-free signal for the remaining UE (UE4 or UE5 depending on which message was decoded previously). The probability that the last UE cannot be decoded will be very low.

In all three cases, which are related to the above mentioned setup, it is clear that frequency hopping in combination with interference cancellation, using buffered signals, allows for quick resolution of the colliding UE packets and/or messages. Without these two techniques, the latency of the system would increase until the accumulated energy would suffice for decoding of messages transmitted by each UE. If some of the UEs are not using all its allocated transmission opportunities for transmitting a signal, the detection and IC tasks will be even easier for a network node.

Example of how to Obtain a Transmission Pattern

As disclosed above, the number of UEs served by the network node (N), the number of transmissions (L) and the number of SR-less resources to frequency hop over (M), are relevant input parameters for obtaining a transmission pattern.

Another relevant parameter to consider is the transmission timing structure related to the transmissions. The transmission timing structure may e.g. be used for maintaining a common perception of timing between the terminal and the network.

One example of maintaining a common perception of timing between the terminal and the network is provided in LTE. In LTE, the time space is represented by a transmission timing structure of a first type indicating 10 millisecond (ms) intervals, where each 10 ms interval is numbered between 0 and 1023. Each 10 ms transmission timing structure is denoted a Radio Frame (RF) and each RF is assigned a number, a Radio Frame Number (RFN) from 0 to 1023. These numbers are repeated cyclically so that a radio frame directly following an RF assigned number 1023, is assigned number 0. Therefore a transmission timing structure is said to be 1024 since 0-1023 represents 1024 transmission timing structure instances. In addition, there is a transmission timing structure of a second type indicating 1 ms intervals. This transmission timing structure is called a subframe and is numbered between 0 and 9. The cycle of a subframe is 10 subframes. The transmission timing structure of the second type is called subframe number. When a subframe number reaches its maximum value (=9), the consecutive transmission timing structure of the second type is numbered to 0 while the numbering of the transmission timing structure of the first is increased by 1. When the numbering of a transmission timing structure of the first type reaches its maximum value (=1023), a consecutive transmission timing structure of the first type is numbered to 0. One can say that the transmission timing structures of the first type and the second type have different cycles (e.g. a RFN cycle or subframe cycle) represented by their corresponding maximum numbering and interval indication. The maximum numbering value and the indicated time interval may assume different values than those given in the above example from LTE. Generally, it shall be mentioned that a cycle in this disclosure may relate to any transmission timing structure with any maximum numbering and interval indication. E.g. an interval indication may also pertain to a slot or a mini-slot or an OFDM symbol with a repeated and/or cyclic numbering.

In analogy to LTE, it is generally disclosed that a slot and/or TTI and/or transmission opportunity may be comprised in a transmission timing structure indicating a time interval of $t_1$ ms and that the transmission timing structure has a cycle due to its maximum numbering value, as described above. The maximum numbering value may generally be expressed as $C_1$ and a range of cyclic numbering values for a transmission timing structure may e.g. be integers between 0 and $C_1-1$ or integers between 1 and C1. In this disclosure, the numbering of a sequence of available transmission opportunities can be assumed to not exceed $C_1+1$ (when $C_1$ starts at 0). In this way a transmission opportunity can be uniquely defined in a semi-persistent or cyclic manner, by indicating the transmission opportunities (e.g. slots and/or TTIs and/or mini-slots by their cyclic numbering within its respective cycle). It shall be noted that L (maximum number of transmissions/repetitions) is generally less than $C_1$.

As part of configuring a UE with a transmission pattern indicating resources (e.g. SR-less resources) a network node may determine which UEs that are assigned to use which future time-frequency resources (such as RBs and/or grant-free/SR-less resources). A network node may determine such UEs by e.g. receiving a registration from UEs that are capable of and/or configured to transmit signals using SR-less resources. A network node may additionally and/or optionally allocate an index to each assigned UE. Said index may e.g. be n=1, 2, . . . , N, where N=number of UEs that are assigned to use SR-less time-frequency resources. Let a UE assigned with index n be denoted UEn The network node may additionally and/or optionally determine a series of TTIs within a transmission timing structure, which a specific UEn may use to transmit a signal comprising a message. E.g. a network node may let $s_i$ represent a specific transmission timing structure with a cycle as described above. In this example i=1, 2, . . . , L and where L=number of transmissions and/or repetitions within one cycle of the applicable transmission timing structure. Consequently, one way to determine a series of TTIs could be to simply select the series $s_1=1, s_2=2, s_3=3, \ldots, s_L$ where $s_L=L$. In the previous example $s_i=i$.

Alternatively, a network node may determine the series of transmission opportunities by letting $s_i$ be different from i. This means that the $s_i$ does not have the same number as the transmission timing structure (e.g. a slot) and therefore $s_i$ is referred to as "alias" number. Below, there are further examples of how a network node may assign alias numbers:
  a. Selecting the first L positive integers which are not evenly divisible by M, e.g., if L=6, M=3 then $s_1=1$, $s_2=2, s_3=4, s_4=5, s_5=7, s_6=8$; or
  b. Selecting the first L prime numbers, including 1 and excluding M, if M is a prime number. E.g., if L=6, M=3 then $s_1=1, s_2=2, s_3=5, s_4=7, s_5=11, s_6=13$. Here, 3 is a prime number but it is excluded, since it equals M In order for a UE to determine the SR-less resources to use for transmission of signals, a network node may transmit a configuration message to the UE, wherein the configuration message comprises information so that the UE may infer the SR-less resources to use for transmission.

If a UE transmits a message using the i-th slot, it will use either the i-th slot's true repetition sequence number i or its alias $s_i$, to determine its assigned SR-less resource (e.g. RB). By doing so, UEs may also be assigned numbers and/or indices, n, by e.g. a network node (e.g. a gNB or eNB); thus a UE may, by combining its assigned UE number, e.g., n for $UE_n$, with the slot number i or its alias $s_i$, a UE may determine the SR-less resource to use for transmission, based on the received transmission pattern by inferring the SR-less resources by applying a known function taking n, $s_i$ and/or i as parameters. Alternatively, the network node may be explicit when configuring a UE with a transmission pattern and e.g. indicate the frequency resources (e.g. sub-carriers) to use at certain time resources (e.g. transmission timing structures), in particular L time resources within the cyclic numbering range of a timing structure.

In order for the network node to benefit from the advantages of user diversity and interference cancellation as described above, the network node may provide a grouping of UEs that will apply to a transmission opportunity ($s_i$). The grouping pertains to that more than one UE may be configured by their respective transmission patterns, to simultaneously use the same SR-less resources for transmitting a signal to the network node. The grouping may be altered between transmission opportunities as illustrated in e.g. FIG. 3 in which it is disclosed that UE1 and UE2 are assigned and/or allocated to transmit a signal using the same, or at least partly overlapping, SR-less resources (f3, TTI1) for L=1. However, when L=2, UE1 and UE3 are assigned and/or allocated to transmit a signal using the same, or at least partly overlapping, SR-less resources (f3, TTI4). This is an example of that the grouping is altered between transmission opportunities. This can be ensured by the network node configuring UEs with a transmission pattern indicating time-frequency resources, in particular SR-less and/or grant-free resources. For a certain transmission opportunity, all UEs in one group are supposed to use at least partly overlapping resources.

An example of how to obtain overlapping transmissions and regrouping of UEs, a network node may, for each transmission opportunity ($s_i$) in a transmission pattern, allocate UEs with certain index n to transmit using a certain SR less resource f(n) (e.g. f1, f2 or f3 in FIG. 3). The allocation and/or assignment of resources f(n) to UEs may be performed by the network node by assigning UEs with index n to a resource f(n) by applying a mapping of UEs to grant-free/SR-less resources for each slot i (e.g. $s_i$) to obtain a transmission pattern:

a. A mapping and/or assignment of a resource f (e.g. a frequency resource) to a UEn in slot i and/or $s_i$ in a transmission pattern, may be obtained by e.g.:

$$f(n, i) \triangleq \left[\left(\left\lceil s_i \times \frac{n}{M}\right\rceil - 1\right) \text{modulo } M\right] + 1.$$

When applying function f above, each UE-index and slot pair (n, i) will give an integer number between 1 and M, where M may be an integer number of available SR-less resources (e.g. frequency resources), a network node may map each UE-index and slot pair (n, i) to an SR-less resource and thereby obtain a transmission pattern for each UEn, wherein the transmission pattern indicates SR-less time-frequency resources.

b. Additionally and/or optionally, a network node may provide further diversity, to the transmission pattern by permuting the mapping of UE index and slot pair to SR-less resources f. Some examples of how a network node may obtain further diversity when obtaining the transmission patterns is described in examples provided below.
  i. A UE index and slot pair (n, i) is allocated and/or mapped to frequency resource $f_m$, where m= 1, 2, 3, ..., M.
  ii. For odd-numbered slots and/or transmission opportunities, e.g., when (i modulo 2)≠0, a UE index and slot pair mapped to a frequency resource $f_m$, the mapping may be rotated or permuted clockwise, e.g. a UE-index and slot pair originally mapped to $f_m$, for an odd-numbered slot, may instead be mapped to $f_{m+1}$. When performing the permutation, $f_M$ is mapped to $f_1$. Analogously, for even time-slots, the mapping to an SR-less frequency resource $f_m$ may instead be mapped to $f_{m-1}$. In this case, $f_1$ would be mapped to $f_M$, when performing the permutation counter-clockwise.
  iii. Optionally (ii.) is reversed, i.e., the rotation is clockwise at even time-slots and counter-clockwise at odd time-slots
  iv. Additionally and/or optionally, for the i-th time-slot, the UE-index and slot pair (n, i) may be mapped to $f_l$ where $l=[(s_i+m-2)\text{modulo } M]+1$.

v. Additionally and/or optionally, for the i-th time-slot, the UE-index and slot pair (n, i) may be mapped to $f_l$ where $l=[(i+m-2)\text{modulo } K]+1$.

By way of example, there is disclosed a method for operating a network node (100), the method comprises configuring a first User Equipment, UE, with a first transmission pattern indicating time-frequency resources and configuring a second UE with a second transmission pattern indicating time-frequency resources. The time-frequency resources may be SR-less resources. SR-less resources may be semi-persistently allocated and/or scheduled by a network node, for use by a UE when transmitting signals, without requesting a permission and/or a grant from the network before using these resources for transmission of signals. A network node may use these resources for receiving signals from UEs. The method may also comprise receiving a first signal comprising a first data packet from the first UE, using a first time-frequency resource indicated by the first transmission pattern and receiving a second signal comprising a second message from the second UE, using a second time-frequency resource indicated by the second transmission pattern, wherein the first- and second time-frequency resources, at least partly, overlap. The first- and second time-frequency resources are at least partly overlapping if they share at least one resource element. The method further comprises decoding the second message, based on a received third signal comprising the first message from the first UE, wherein the third signal is received using a third time-frequency resource indicated by the first transmission pattern. It shall be noted that grouping and/or regrouping is achieved by configuring the UEs with different transmission patterns.

In this way, an efficient compromise of latency and resource utilization is obtained for e.g. uRRLC use cases as described herein.

Further, it may be considered that the decoding action in the method comprises performing interference cancellation. The interference cancellation may be performed based on a buffered representation of received signals by subtracting a representation of a received signal which comprises a message which was successfully decoded. The representation of the received signal comprising a successfully decoded message may not need to be buffered. Consequently, the method may optionally comprise buffering a first representation of the received signals using the first- and second time-frequency resources; and/or buffering a second representation of the received signal using the third time-frequency resources. Generally, buffering a representation of a received signal pertains to storing a software representation of information to recreate what was received by the network node on certain resources.

It may be considered that for this method, the second transmission pattern indicates time-frequency resources which are not overlapping with the third time-frequency resource. It may optionally also be considered that the first time-frequency resources are not overlapping with the third time-frequency resources.

In some cases the third signal in this method is received before receiving the first- and second signals. Alternatively, the third signal is received after receiving the first- and second signals.

This method may also comprise transmitting an acknowledgement to the first- and/or the second UE, where the acknowledgement indicates a successful decoding of the first- and/or the second message. In this way, the UE will not have to repeat the transmission and consequently facilitate for other UEs to transmit a message that will be successfully decoded by the network node.

It may also be considered that the time-frequency resources indicated by a transmission pattern in this method are SR-less resources.

In another exemplary aspect, there is disclosed a network node (100). The network node comprises a processing circuitry adapted for configuring a first User Equipment, UE, with a first transmission pattern indicating time-frequency resources and configuring a second UE with a second transmission pattern indicating time-frequency resources. The processing circuitry of the network node is further adapted for receiving a first signal comprising a first data packet from the first UE, using a first time-frequency resource indicated by the first transmission pattern and receiving a second signal comprising a second message from the second UE, using a second time-frequency resource indicated by the second transmission pattern, wherein the first- and second time-frequency resources, at least partly, overlap. The time-frequency resources may be SR-less resources. SR-less resources may be semi-persistently allocated and/or scheduled by a network node, for use by a UE when transmitting signals, without requesting a permission and/or a grant from the network before using these resources for transmission of signals. A network node may use these resources for receiving signals from UEs. The processing circuitry of the network node is further adapted for decoding the second message, based on a received third signal comprising the first message from the first UE, wherein the third signal is received using a third time-frequency resource indicated by the first transmission pattern.

In this way, an efficient compromise of latency and resource utilization is obtained for e.g. uRRLC use cases as described herein.

Further, it may be considered that decoding comprises performing interference cancellation. The interference cancellation may be performed based on a buffered representation of received signals by subtracting a representation of a received signal which comprises a message which was successfully decoded. The representation of the received signal comprising a successfully decoded message may not need to be buffered. Consequently, the network node may optionally be further adapted for buffering a first representation of the received signals using the first- and second time-frequency resources; and/or buffering a second representation of the received signal using the third time-frequency resources. Generally, buffering a representation of a received signal pertains to storing a software representation of information to recreate what was received by the network node on certain resources.

By way of example, the second transmission pattern may indicate time-frequency resources not overlapping with the third time-frequency resource.

It may also be considered that the first time-frequency resources are not overlapping with the third time-frequency resources.

In some cases the third signal is received before receiving the first- and second signals. Alternatively, the third signal is received after receiving the first- and second signals. The processing circuitry of the network node may optionally and/or additionally further adapted for transmitting an acknowledgement to the first- and/or the second UE, where the acknowledgement indicates a successful decoding of the first- and/or the second message. In this way, the UE will not have to repeat the transmission and consequently facilitate for other UEs to transmit a message that will be successfully decoded by the network node.

In some case the time-frequency resources indicated by a transmission pattern are SR-less resources.

Figure 8:
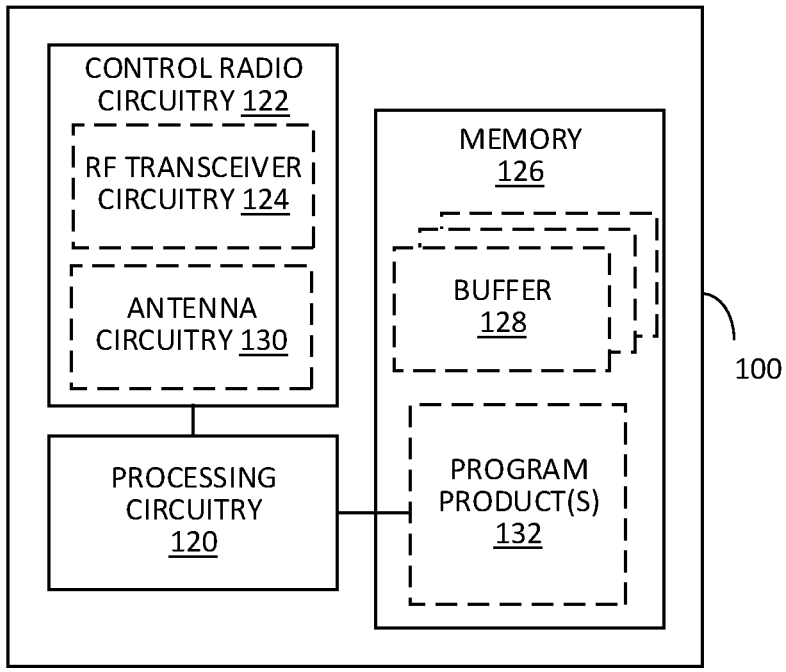
FIG. 8-9, showing exemplary network nodes.

FIG. 8 schematically show a network node 100, which in particular may be an eNB, or gNB or similar for NR. Network node 100 comprises processing circuitry (which may also be referred to as control circuitry) 120, which may comprise a controller connected to a memory 126, which may comprise buffers 128 for storing e.g. signals and/or information related to signals. Any module, e.g. transmitting module and/or receiving module and/or configuring module of the network node 100 may be implemented in and/or executable by the processing circuitry 120. The processing circuitry 120 is connected to control radio circuitry 122 of the network node 100, which comprises a RF transceiver circuitry 124 that provides receiver and transmitter and/or transceiver functionality (e.g., comprising one or more transmitters and/or receivers and/or transceivers). An antenna circuitry 130 may be comprised in and/or connected to radio circuitry 122 for signal reception or transmittance and/or amplification. The network node 100 may be adapted to carry out any of the methods for operating a network node disclosed herein; in particular, it may comprise corresponding circuitry, e.g. processing circuitry, and/or modules. The antenna 130 circuitry may be connected to and/or comprise an antenna array. The network node 100, respectively its circuitry, may be adapted to transmit configuration data and/or to configure a terminal as described herein. The network node 100, respectively its circuitry, may be additionally be adapted to receive one or more signals comprising messages from a terminal and/or UE as described herein.

Figure 1A:
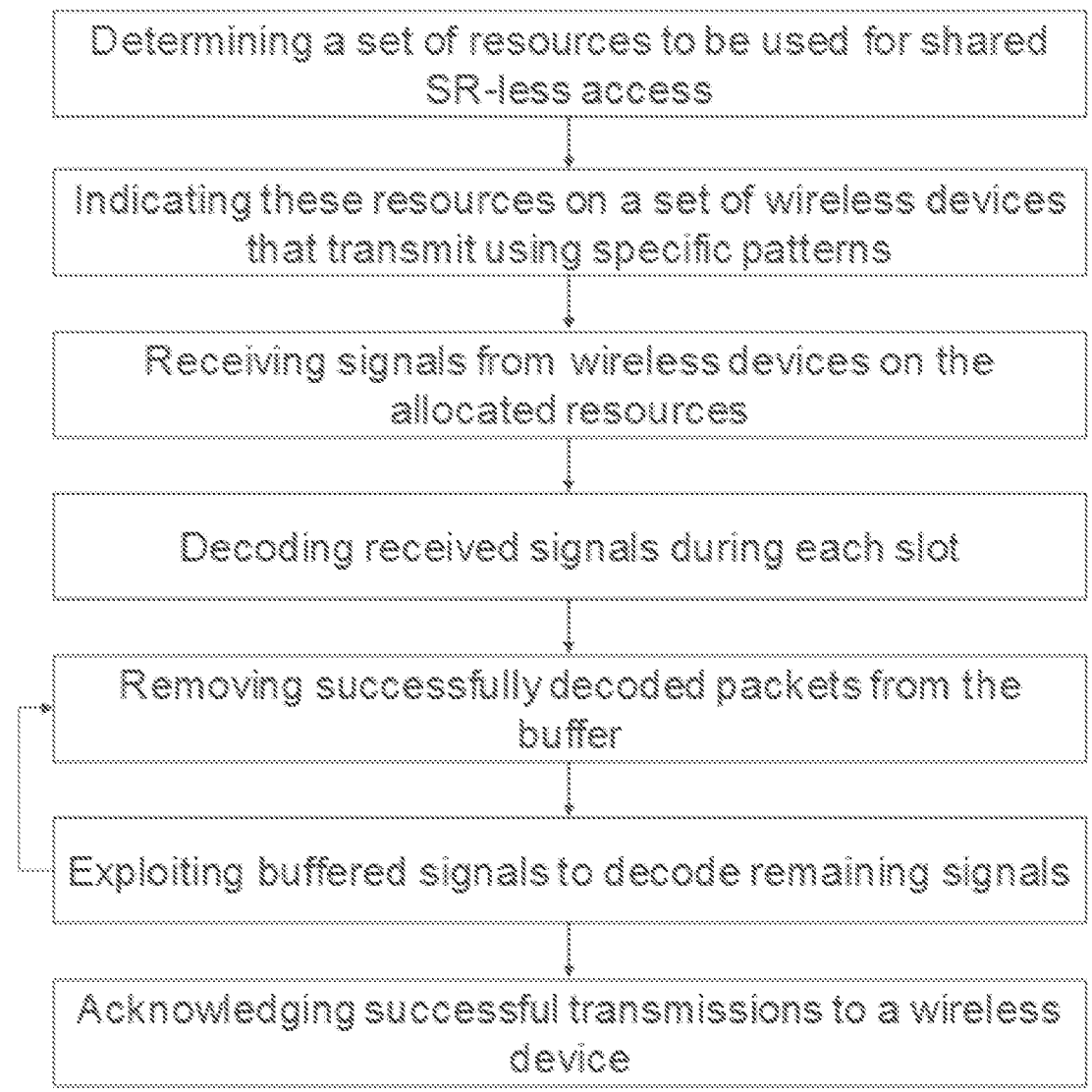
FIGS. 1a and 1b illustrates exemplary diagrams of a method of operating a network node according to this disclosure.
Figure 1B:
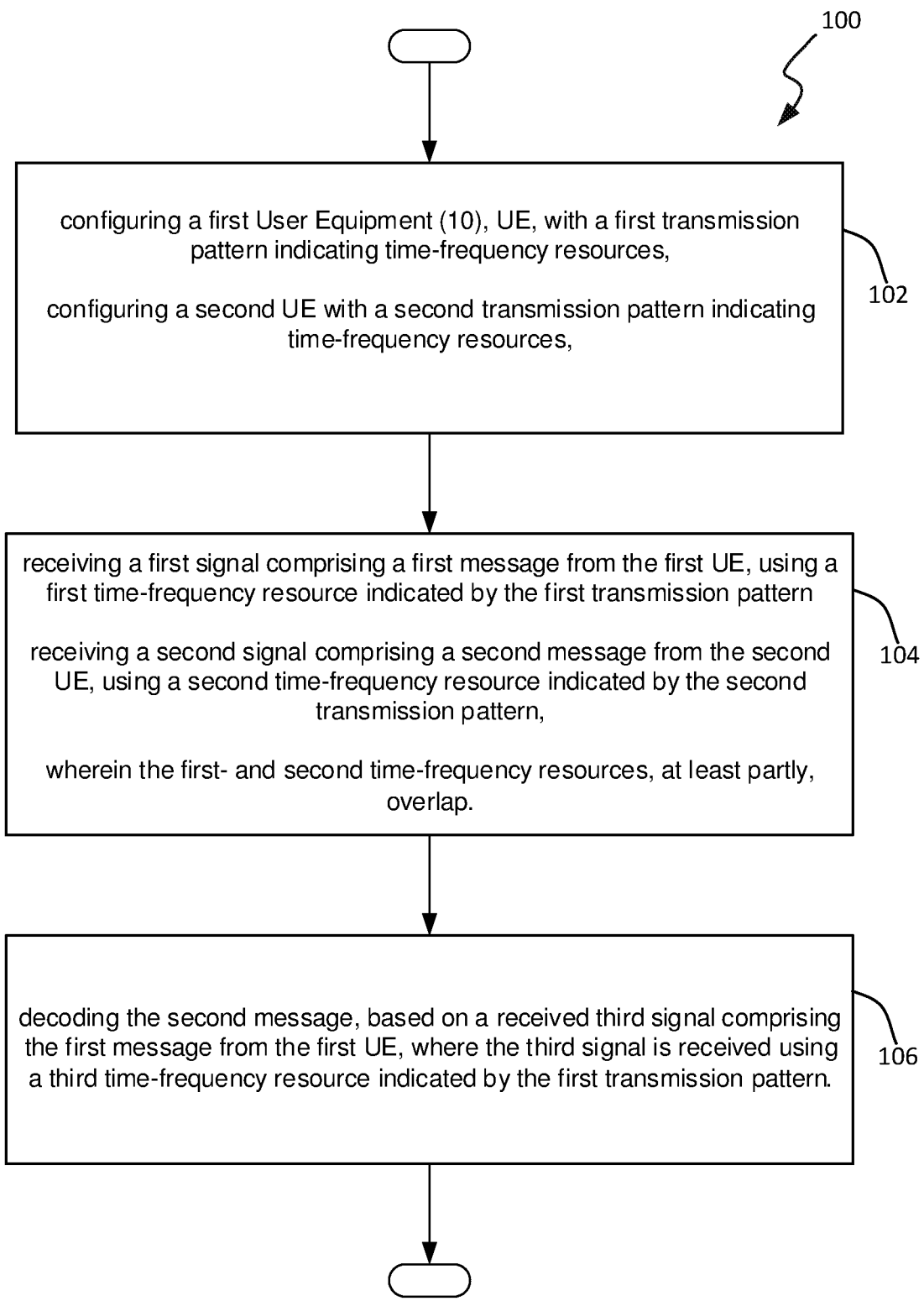

FIG. 1b shows a diagram for an exemplary method of operating a network node, which may be any of the network nodes described herein, in particular a gNB or eNB. The method comprises the actions 102 of configuring at least two UEs with a respective transmission pattern, receiving 104 at least two signals comprising a respective message and decoding 106 one of the messages based on a received signal comprising the other message, which is not subject for deduction.

Figure 9:
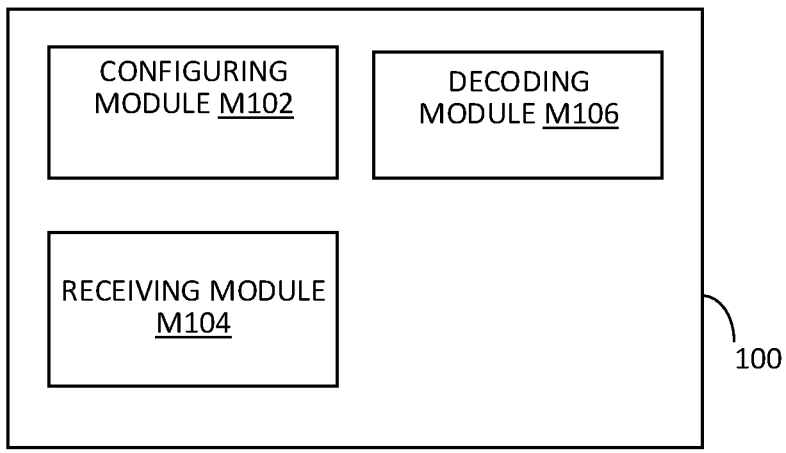

FIG. 9 shows a schematic of an exemplary network node. The network node may comprise a configuring module M102, a receiving module M104 and a decoding module M106 for performing the respective actions 102, 104 and 106.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. Acknowledgement signaling may comprise one or more bits (e.g., for ACK/NACK) for an acknowledgement signaling process, and/or comprise additional information, e.g. indicating that a data element was not received and/or scheduled.

Signaling may generally comprise one or more symbols and/or signals and/or messages. A signal may comprise one or more bits. An indication may represent signaling, and/or be implemented as a signal, or as a plurality of signals. Signaling, in particular acknowledgement signaling, may comprise a plurality of signals and/or messages, which may be transmitted on different carriers and/or be associated to different acknowledgement signaling processes, e.g. representing and/or pertaining to one or more such processes. An indication, may comprise signaling and/or a plurality of signals and/or messages, which may be transmitted on different carriers and/or be associated to different acknowledgement signaling processes, e.g. representing and/or pertaining to one or more such processes. A message may represent a block of data jointly encoded and/or modulated, and/or information (e.g., one or more indications) transmitted together. A message may be addressed to a specific receiver, e.g. a user equipment or a network node. It may be considered that a message has a format, which may be defined according to a standard, in particular according to a 3GPP standard like NR.

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent and end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries.

A radio access network may be a wireless communication network, and/or a Radio Access Network (RAN) in particular according to a communication standard. A communication standard may in particular be a standard according to 3GPP and/or 5G, e.g. according to NR or LTE, in particular LTE Evolution.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node.

Signaling may generally comprise one or more signals and/or one or more symbols. Reference signaling may comprise one or more reference signals or symbols.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE.

A resource generally may represent a time-frequency resource (e.g. a set of resource elements), on which signaling according to a specific format may be transmitted and/or be intended for transmission, and/or a code resource and/or a power resource. The format may comprise one or more substructures, which may be considered to represent a corresponding sub-resource (as they would be transmitted in a part of the resource).

A first and a second resource may be considered to overlap if they are allocated to simultaneously receive and/or transmit on at least one common resource element. E.g. if a first radio node transmits a first signal using a first resource and a second radio node transmits a second signal using a second resource, the first- and second resources are considered to overlap if at least one resource element is used for transmission and/or reception simultaneously.

Control information or a control information message or corresponding signaling may be transmitted on a control channel, e.g. a physical control channel, which may be a downlink channel or uplink channel. For example, downlink control information, e.g. a corresponding message, may be signaled by a network node on PDCCH (Physical Downlink Control Channel) and/or a PDSCH (Physical Downlink Shared Channel) and/or a HARQ-specific channel. Uplink control information, e.g. acknowledgement signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding one or more transmission timing structures and/or scheduled first signaling (e.g., data transmission) and/or the starting symbol. A radio node may configure itself, e.g., based on configuration data received from a network or network node. A network node may utilise, and/or be adapted to utilise, its circuitry/ies for configuring.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

Control signaling may be considered signaling of, and/or comprising, control information. Control information may be provided in a control information message. Control information may comprise in particular scheduling information like a grant (of uplink and/or downlink and/or sidelink resource/s) and/or a slot allocation indication and/or symbol allocation indication and/or power control information and/or link adaptation information and/or precoding information, e.g. for the downlink or downlink control information. In other cases, control information may comprise acknowledgement signaling (respectively, associated acknowledgement information), and in some variants in addition scheduling requesting information and/or measurement-related information, e.g. for the uplink or uplink control information.

A carrier may generally represent a frequency range or band. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency space.

It should be noted that the term "radio" in this disclosure may be considered to pertain to wireless communication in general, and may also include wireless communication utilising microwave frequencies.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting using a resource, such as a frequency (band) or spectrum associated to the cell or carrier. In particular, a radio node may receive or transmit using time frequency resources (e.g. resource elements). A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain.

A transmission timing structure may have a duration (length in time) determined based on the durations of their symbols, possibly in addition to cyclic prefix/es used. The symbols of a transmission timing structure may have the same duration, or may in some variants have different duration. A slot may be considered an example of a transmission timing structure, and the term slot may be considered to be interchangeable with the term transmission timing structure in the context of this disclosure. A transmission timing structure or slot may comprise a predetermined number of symbols, e.g. 7 or 14. A mini-slot may comprise a number of symbols smaller than the number of symbols of a slot. A transmission timing structure may cover a time interval of a specific length, which may be dependent on symbol time length and/or cyclic prefix used. A transmission timing structure may pertain to and/or cover a specific time interval in a time stream, e.g. synchronized for communication. It should be noted that a subframe may be considered an example of a slot or transmission timing structure with a fixed duration of 1 ms. Generally, a transmission timing structure may be considered a resource, in particular a time resource.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Abbreviations

Some useful abbreviations comprise
DMRS Demodulation Reference Signal
ACK Acknowledgement
IC Interference Cancellation
LTE Long-Term Evolution
NR New Radio
RACH Random Access Channel
SIC Successive Interference Cancellation
SPS Semi-persistent scheduling
SR Scheduling request
RFN Radio Frame Number
uRLLC ultra-reliable low-latency communications
UE User Equipment

REFERENCES

1. RAN1 Chairman's notes, RAN1 #87AdHoc, Spokane, USA Jan. 16-20, 2017
2. Final Report of 3GPP TSG RAN WG1 #AH_NR2, Qingdao, China, June 2017

The invention claimed is:

1. A method for operating a network node, the method comprises:
    configuring a first User Equipment (UE) with a first transmission pattern indicating time-frequency resources;
    configuring a second UE with a second transmission pattern indicating time-frequency resources;
    receiving a first signal comprising a first message from the first UE, using a first time-frequency resource indicated by the first transmission pattern;
    receiving a second signal comprising a second message from the second UE, using a second time-frequency resource indicated by the second transmission pattern, wherein the first and second time-frequency resources, at least partly, overlap; and
    decoding the second message, based on a received third signal comprising the first message from the first UE, wherein the third signal is received using a third time-frequency resource indicated by the first transmission pattern.

2. The method of claim 1, wherein decoding comprises: performing interference cancellation (IC).

3. The method of claim 1, further comprising:
    buffering a first representation of the received signals using the first and second time-frequency resources; and/or
    buffering a second representation of the received signal using the third time-frequency resources.

4. The method of claim 3, wherein the interference cancellation is based on the buffered representation of received signals.

5. The method of claim 1, wherein the second transmission pattern indicate time-frequency resources not overlapping with the third time-frequency resource.

6. The method of claim 1, wherein the first time-frequency resources are not overlapping with the third time-frequency resources.

7. The method of claim 1, wherein the third signal is received before receiving the first and second signals.

8. The method of claim 1, wherein the third signal is received after receiving the first and second signals.

9. The method of claim 1, further comprising:
transmitting an acknowledgement to the first and/or the second UE, where the acknowledgement indicates a successful decoding of the first and/or the second message.

10. The method of claim 1, wherein the time-frequency resources indicated by a transmission pattern are SR-less resources.

11. A network node comprising processing circuitry adapted for:
configuring a first User Equipment (UE) with a first transmission pattern indicating time-frequency resources;
configuring a second UE with a second transmission pattern indicating time-frequency resources;
receiving a first signal comprising a first message from the first UE, using a first time-frequency resource indicated by the first transmission pattern;
receiving a second signal comprising a second message from the second UE, using a second time-frequency resource indicated by the second transmission pattern, wherein the first and second time-frequency resources, at least partly, overlap; and
decoding the second message, based on a received third signal comprising the first message from the first UE, wherein the third signal is received using a third time-frequency resource indicated by the first transmission pattern.

12. The network node of claim 11, wherein decoding comprises:
performing interference cancellation (IC).

13. The network node of claim 11, further adapter for:
buffering a first representation of the received signals using the first and second time-frequency resources; and/or
buffering a second representation of the received signal using the third time-frequency resources.

14. The network node of claim 13, wherein decoding the second message comprises performing interference cancellation, and wherein the interference cancellation is based on the buffered representation of received signals.

15. The network node of claim 11, wherein the second transmission pattern indicates time-frequency resources not overlapping with the third time-frequency resource.

16. The network node of claim 11, wherein the first time-frequency resources are not overlapping with the third time-frequency resources.

17. The network node of claim 11, wherein the third signal is received before receiving the first and second signals.

18. The network node of claim 11, wherein the third signal is received after receiving the first and second signals.

19. The network node of claim 11, further adapted for:
transmitting an acknowledgement to the first- and/or the second UE, where the acknowledgement indicates a successful decoding of the first and/or the second message.

20. The network node of claim 11, wherein the time-frequency resources indicated by a transmission pattern are SR-less resources.

* * * * *